United States Patent [19]

Ball et al.

[11] 4,329,872
[45] May 18, 1982

[54] HIGH PRESSURE HYDRAULIC TESTING PACKER

[75] Inventors: Frank C. Ball, Long Beach; Edmund Wardle, Burbank, both of Calif.

[73] Assignee: Hydro-Test Inc., Long Beach, Calif.

[21] Appl. No.: 189,181

[22] Filed: Sep. 22, 1980

[51] Int. Cl.³ ............................................. G01M 3/28
[52] U.S. Cl. ................................................... 73/49.5
[58] Field of Search ............. 73/49.5, 49.1, 46, 40.5 R

[56] References Cited

U.S. PATENT DOCUMENTS

| | | | |
|---|---|---|---|
| 2,953,919 | 9/1960 | Potts | 73/49.5 |
| 2,955,458 | 10/1960 | Sonnier et al. | 73/49.5 X |
| 3,199,598 | 8/1965 | Loomis | 73/49.1 X |
| 3,478,577 | 11/1969 | Hauk | 73/49.1 |
| 3,503,249 | 3/1970 | Dumond | 73/49.1 |
| 3,712,115 | 1/1973 | Miller | 73/49.1 |
| 3,787,226 | 1/1974 | Iglehart et al. | 73/49.1 X |
| 4,081,990 | 4/1978 | Chatagnier | 73/49.1 X |
| 4,152,924 | 5/1979 | Mayo | 73/49.1 X |
| 4,182,159 | 1/1980 | Churchman | 73/49.5 X |

Primary Examiner—Kyle L. Howell
Assistant Examiner—Joseph W. Roskos
Attorney, Agent, or Firm—William C. Babcock

[57] ABSTRACT

A resilient packer that may be mounted on a high pressure hydraulic testing unit to permit the unit to be moved axially through a string of tubular members connected end to end by collars. The tubular members have flat ring-shaped end surfaces that are disposed as pairs within the collars connecting the tubular members. The end surfaces of each of the pairs are longitudinally spaced a substantial distance. The packer is of such structure that a portion thereof is radially compressed into fluid sealing contact with the interior surface of the tubular member in which it is disposed, but which packer will not hang up on one of the end surfaces when it traverses the longitudinal space between a pair thereof as the testing unit is axially moved through the string of tubular members.

1 Claim, 3 Drawing Figures

FIG.1
FIG.2
FIG.3
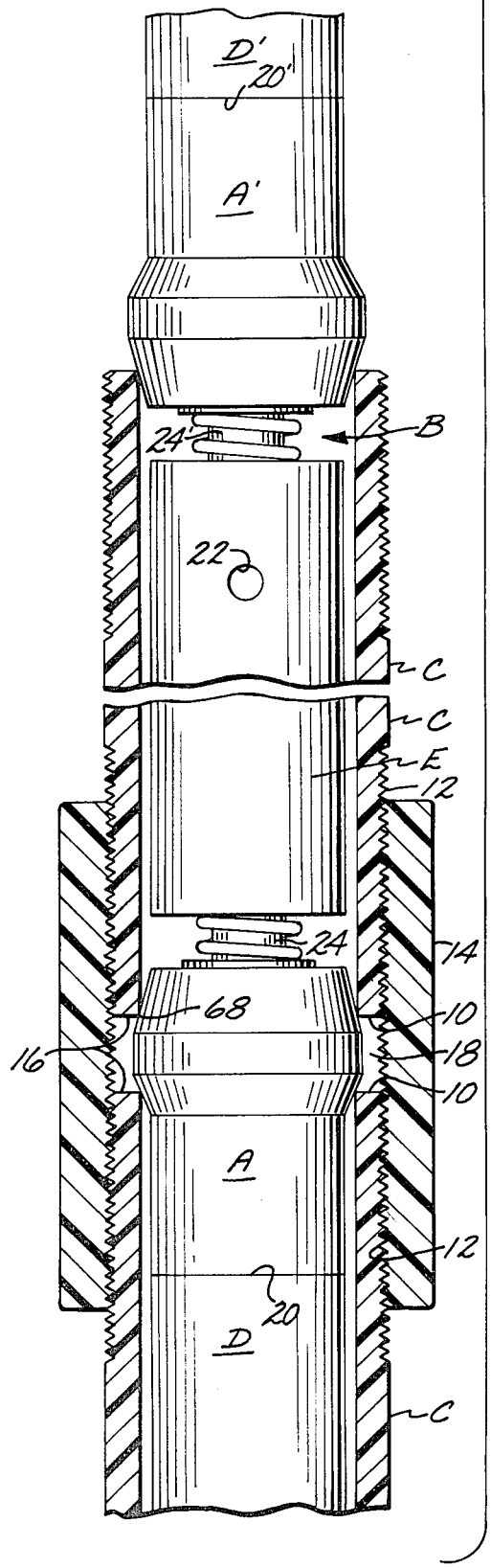
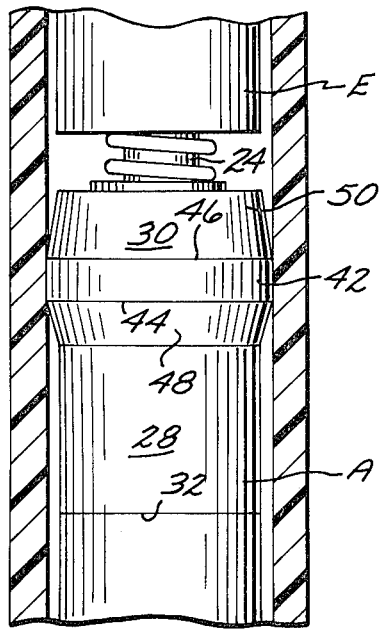
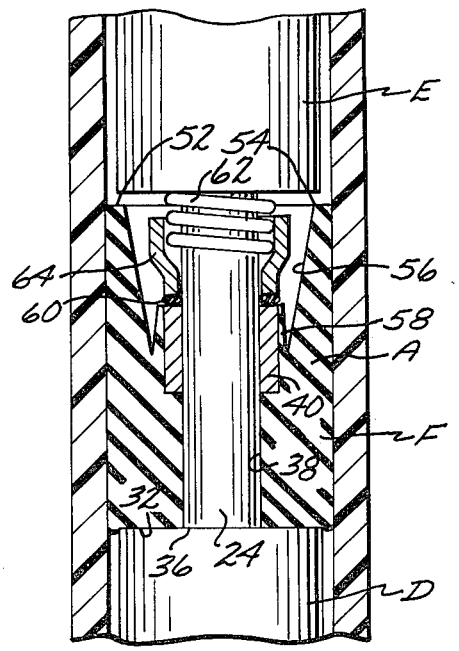

HIGH PRESSURE HYDRAULIC TESTING PACKER

BACKGROUND OF THE INVENTION

1. Field of the Invention
High Pressure Hydraulic Testing Packer.

2. Description of the Prior Art

In the past it has been common practice to test a string of collar connected tubular members by longitudinally moving a hydraulic testing unit to a desired position therein. Such a unit has two longitudinally spaced packers thereon that cooperate with the interior surface of the tubular members adjacent thereto to define an elongate confined space into which high pressure water may be discharged to hydraulically test the portion of the tubular members between the pair of packers.

During the past few years, tubular members have begun to be supplied for oil field use that have flat ring-shaped end surfaces and externally threaded end portions. When the tubular members are connected end-to-end by collars that engage the threaded end portions, the two adjoining ring-shaped end surfaces within each collar are longitudinally spaced a substantial distance. In hydraulically testing a string of collar connected tubular members by a testing unit having a pair of prior art resilient packers thereon it has been found that end portions of the packers tend to become hung up on one of the end surfaces as the testing unit is moved longitudinally through the string of tubular members. Such a hang up occurs from a radially compressed portion of the packer expanding outwards as it traverses the longitudinal space between a pair of the flat ring shaped end surfaces.

A major object of the invention is to provide a resilient packer for use on a high pressure hydraulic testing unit that while having a portion thereof that is radially compressed and slidably and sealingly engages the interior surface of the tubular member in which it is disposed is free of the operational disadvantage of becoming hung up on an end surface of a tubular member as the packer traverses the longitudinal distance between two of such end surfaces.

SUMMARY OF THE INVENTION

The packer of the present invention is formed from an elastomeric material such as rubber or the like, and includes first and second integrally formed portions.

The first portion has a flat ring-shaped first end surface, a first cylindrical external surface, and a centered bore that extends longitudinally from the inner periphery of the first end surface to communicate with a rigid metallic tube embedded in the elastomeric material.

The second portion is of generally cup-shape configuration and is longitudinally aligned with the first portion. The second portion is defined by a second cylindrical external surface of a diameter greater than the interior diameter of the tubular members being tested, and as a result the part of the second portion inwardly from the second external surface is radially compressed when the packer is disposed in a tubular member.

The second portion is further defined by a first side wall section that tapers outwardly from the first cylindrical external surface to terminate in a first periphery of the second external cylindrical surface. A second external side wall section tapers inwardly from a second periphery of the second external cylindrical surface to terminate in a flat ring-shaped second end surface. A first conical internal surface extends longitudinally from the inner periphery of the second end surface towards the first end surface to a position intermediate the ends of the metallic tube, and a second conical surface extending from this position over a portion of the external surface of the metallic tube.

The width of the second side wall section is greater than the distance between two adjoining end surfaces of two of the tubular members, and as a result the second end surface has traversed this distance prior to the second cylindrical side wall surface becoming transversely aligned therewith and tending to expand radially therein. When such radial expansion takes place, the second side wall section is in slidable contact with the inner periphery of one of the ring-shaped end surfaces, and longitudinal movement of the packer continues without danger of the packer becoming hung up on one of the tubular member ring-shaped end surfaces. When the packer is moved longitudinally in a string of tubular members in the opposite direction, the tapered side wall section serves the same function as the second tapered side wall section above described.

When the packer is mounted on a hydraulic testing unit the first end surface is in abutting contact with the flat end surface of a mandrel or collar, and the metallic tube snugly engaging a rigid rod or tube that projects from the mandrel.

BRIEF DESCRIPTION OF THE DRAWING

FIG. 1 is a combined longitudinal cross-sectional and side elevational view of a pair of the packers mounted on a hydraulic testing unit and disposed in a string of collar connected tubular members;

FIG. 2 is a side elevational view of the packer prior to being subjected to hydraulic pressure; and FIG. 3 is a side elevational view of the packer after being deformed by hydraulic pressure.

DESCRIPTION OF THE PREFERRED EMBODIMENT

The resilient packer A of the present invention is used on a hydraulic testing unit B of the type that can be moved longitudinally in a string of tubular members C to be tested, which tubular members have flat ring-shaped end surfaces 10 and externally threaded end portions 12. The tubular members are removably held in end-to-end relationship by internally threaded collars 14. The pair of end surfaces 10 within a collar 14 are separated a substantial longitudinal distance 16. Each pair of adjoining end surfaces 10 and the internal surface of the collar 14 most adjacent thereto cooperate to define a ring-shaped space 18 into which compressed portions of prior art packers tend to radially expand, and the testing unit of which they form a part being hung up by one of the end surfaces 10 being contacted by an expanded portion of the packer.

The testing unit B is of the type that includes two longitudinally spaced mandrels D and D' that have flat adjoining end surfaces 20 and 20' between which a connector assembly E extends and through which pressurized water may flow. The water discharges through an opening 22 in connector assembly E. The end surfaces 20 and 20' have rods 24 and 24' extending therefrom that are a part of the connector assembly E. The rod 24' is hollow to permit pressurized water to flow to opening 22. A second packer A' is provided that is identical to packer A, and accordingly only packer A will be described structurally in detail. The packers A, A' and connector assembly E cooperate to define the testing unit B that may be moved longitudinally in the string of tubular members C to a desired location therein by conventional means (not shown). The packers A, A' define an elongate confined space 26 within the string of tubular members C that is hydraulically tested by pressurized water that discharges through opening 22 that is in communication with a source thereof (not shown).

The resilient packer A as may best be seen in FIG. 2 includes a first portion 28 and second portion 30 of generally cup shape that is formed integral with the first portion. The first portion is defined by a flat first ring-shaped end surface 32 and a first external cylindrical side wall 34. The first end surface 32 has an inner periphery 36 from which a bore 38 extends longitudinally into a first portion and communicates with a rigid metallic tube 40 that is partially embedded in the first portion.

The second portion 30 is defined by a second cylindrical side wall 42 as may be seen in FIG. 2 that has a first periphery 44 and second periphery 46. The second portion 30 is further defined by a first outwardly tapering external side wall section 48 that extends from the first cylindrical side wall 34 to the first periphery 44. The second portion 30 also is defined by a second tapered side wall section 50 that extends inwardly from the second periphery and terminates on the free extremity thereof in a ring-shaped second end surface 52. The inner periphery 54 of the second ring-shaped end surface 52 has a conical inner wall extending longitudinally into the second portion 30 towards the tube 40 and terminating at a position intermediate the ends of the tube. The portion of the tube 40 that extends outwardly from the first portion 38 of the packer A is preferably sheathed on the exterior by a layer of elastomeric material F that defines the packer A.

The packer A, when used, is mounted on rod 24 as may be seen in FIG. 3, and with a resilient sealing ring 62 encircling the rod and abutting against the exposed end edge of the metallic tube 40. A rigid sleeve 64 encircles the rod 24 and has an end thereof in abutting contact with the resilient ring 60. A compressed helical spring encircles the rod 24, with one end abutting against the connector assembly E, and the other end disposed within the sleeve 64, to urge the latter towards the tube 40 and in so doing compress the resilient ring 60 to effect a seal between the sleeve and tube 40.

In FIG. 1 it will be seen that the width of the second tapered section 30 is greater than the distance 16 between the ring-shaped end surfaces 10.

The external diameter of the second end surface 52, the width of the second tapered side wall section 50, and the degree of taper of the latter are critical. When the packer A is being moved upwardly as viewed in FIG. 1, the external diameter of second end surface 52 must be sufficiently small that it will not encounter the downwardly facing end surface 10 after traversing the distance 16. The portion of the resilient packer A bounded by the second cylindrical side wall 42 will expand radially in whole or in part as it traverses the space 18 shown in FIG. 1, and will have to be compressed inwardly again as it enters the upper tubular member C shown in this Figure.

This compression is effected by the tapered second side wall section 50 sliding across the down-turned inner periphery 68 as shown in FIG. 1. Accordingly, the angle of the second tapered cylindrical side wall section 50 is between 15 and 20 degrees, to permit such sliding to take place. Should the angle of the taper on the second cylindrical side wall section 50 be high, there is danger that the sharp edge that defines the inner periphery 68 will dig into the packer A, and longitudinal upward movement of the testing unit B through the string of tubular members C be impeded as result thereof. The width of the second side wall section 50 should be sufficiently great that the second end surface 52 has traversed the distance 16 prior to the upper portion of the second cylindrical side wall 42 entering the space 18 to expand radially as it traverses the latter.

The external diameter of the first end surface 20 is substantially the same as that of the mandrel D, and there is no danger that this end surface will become hung up on the lower internal periphery 16 as the packer A is moved downwardly in the string of tubular members C as illustrated in FIG. 1.

However, when such downward movement occurs, the angle of the first tapered side wall section 48 must be sufficiently small that the section will slide across the inner periphery 68 on the lower position tubular member as shown in FIG. 1 rather than having the inner periphery become embedded in the material defining the packer A which would preclude further downward movement of the testing unit B.

The spring 62 at all times tends to maintain the first end surface 32 of the packer A in abutting contact with the mandrel D, which mandrel as may be seen in FIG. 1 is substantially smaller than the internal diameter of the tubular members C. What has been said of the operation of packer A is also true of the upwardly disposed packer A'.

The use and operation of the invention has been explained previously in detail and need not be repeated.

What is claimed is:

1. In combination with a hydraulic testing unit of the type that includes a pair of longitudinally spaced mandrels that have flat adjacent end surfaces from which rods extend towards one another and being joined by pressurized water conducting means, a pair of resilient packers mounted in longitudinal spaced relationship on said testing unit to permit the latter to be moved longitudinally through a string of tubular members connected by a plurality of collars without becoming hung up therein, said tubular members having flat ring-shaped end surfaces within said collars that are longitudinally spaced from one another a first distance and cooperate with the interior surfaces of said collars to define a plurality of outwardly extending annulus shaped spaces, each of said ring-shaped end surfaces including an inner periphery, each of said packers including:

a. a rigid metallic tube that snugly engages one of said rods;

b. a body of elastomeric material that includes first and second portions, said body having said tube embedded longitudinally in the part of said first portion most adjacent said second portion; said first portion defined by a first ring-shaped end surface, said first end surface having inner and outer peripheries, a first external cylindrical side wall of a diameter substantially smaller than the interior diameter of said tubular members that extends from said outer periphery towards said second portion, a longitudinal bore in said first portion that extends from said inner periphery to communicate with said tube and through which bore one of said rods extends; said second portion of generally cup-shape and defined by a second cylindrical side wall that has first and second peripheries, a first outwardly tapering side wall section that extends from said first periphery, a second inwardly tapering side wall section that extends longitudinally from said second periphery to terminate in a flat ring-shaped end surface that has inner and outer peripheries, a conical interior side wall that extends longitudinally from said inner periphery of said second end wall to a position adjacent said tube, said second cylindrical side wall of a diameter greater than the interior diameter of said tubular members and said elastomeric material inwardly therefrom being compressed as a result thereof when said packer is in one of said tubular members, said outer periphery of said second end wall substantially smaller than the interior diameter of said tubular members, said second tapered side wall section having a sufficiently great width that as said packer moves towards one of said annulus spaces said second end will traverses said first distance prior to said second cylindrical side wall moving into one of said annulus shaped spaces, said second tapered side wall section having a sufficiently low angle that it will slide across the inner periphery of one of said ring-shaped end walls of one of said tubular members rather than have said inner periphery become embedded therein, and said first tapered side wall section also having a sufficiently low angle as to slide across the inner periphery of one of said end walls of said tubular members when said packer is moved thereover; and c. spring means for maintaining said packer in abutting contact with one of said mandrels.

* * * * *